United States Patent Office 3,824,199
Patented July 16, 1974

3,824,199
PROCESS FOR PREPARING SELF-SKINNED POLYURETHANE FOAM
Herbert G. Nadeau, North Haven, and Robert A. Stengard, Bethany, Conn., assignors to The Upjohn Company, Kalamazoo, Mich.
Continuation of abandoned application Ser. No. 657,348, July 31, 1967. This application Feb. 10, 1971, Ser. No. 114,356
Int. Cl. B29d 27/00; C08g 22/44
U.S. Cl. 260—2.5 AZ
5 Claims

ABSTRACT OF THE DISCLOSURE

Novel resilient cellular polyurethanes, characterized by integrally formed tough skins completely surrounding a cellular core, are disclosed. These self-skinned flexible foams are obtained using novel foam mixes so formulated that the cells proximating the surface of the advancing foam collapse on contact with alien surfaces such as mold walls. Such foam mixes require the use of conventional polyisocyanates and polyols, the absence of added water, the use of halogenated aliphatic hydrocarbon blowing agents and, in place of conventional surfactant requirements, the use of no surfactant or the use of a peripheral foam destabilisation agent which is either (a) a conventional antifoaming agent employed in excess of proportions normally recommended or (b) a conventional polyurethane foam surfactant employed in lower proportions than normally recommended. The novel resilient foams are useful in all energy-absorbing applications e.g. safety padding in automobiles, trucks, aircraft etc. as well as in upholstery, packaging, and like industries.

---

This application is a continuation of application Ser. No. 657,348, filed July 31, 1967, and now abandoned.

BACKGROUND OF THE INVENTION

(1) Field of the Invention

This invention relates to novel resilient polyurethane foams and to methods for their preparation and is more particularly concerned with novel resilient polyurethane foams having a tough, integrally formed, skin and with processes for the preparation of same.

(2) Description of the Prior Art

Flexible foams when produced by any of the conventional procedures normally have a thin, easily ruptured skin formed on the exterior during foaming. Flexible polyurethane foams having tough, abrasion resistant outer skins (as opposed to the above thin, easily broken skins inherently produced) are currently in great demand particularly in the transportation industry in which such materials are employed as instrument panel padding, headrests, armrests, A-frame post padding, automobile headliners, and the like. The only satisfactory method of making such products hitherto has been by means of a two-step process in which the skin has been preformed either from polyurethane or from some other material such as polypropylene, ABS, plasticized PVC, and the like. The skin can be bonded to the desired cellular core using appropriate adhesives. Alternatively, the preformed skin is used to line the mold in which the desired object is to be produced. The polyurethane foam mix is deposited between the layers of preformed skin and is allowed to foam and to bond to the outer skin. Typical of such methods are those described in U.S. Pats. 2,893,063, 2,984,651, and 3,258,511, and in British Pat. 1,029,638.

Attempts have been made to produce "self-skinned" polyurethane flexible foams in which the skin is produced as an integral step in the formation of the foam. Such a procedure, if successful, would have obvious advantages, especially in terms of reducing the number of manual operations and hence reducing labor costs, over the two-step procedure described above. U.S. Pats. 3,178,490 and 3,182,104 are typical of procedures in which rigid polyurethane foams having thin skins can be produced by overloading or packing the appropriate mold with foam mix so that the latter is subjected to pressure during molding. The process described in U.S. Pat. 3,099,516 is closely related and has the additional feature of cooling of selected portions of the mold in order to produce thick skins at said positions on the foam surface to impart structural strength thereto. Such procedures give rigid foams with relatively thick skins. Unfortunately, such technology does not give correspondingly good results when applied to flexible foams particularly those wherein a low density core is required.

French Pats. 1,440,710 and 1,448,751 describe self-skinned flexible foams and methods for their preparation, respectively. However, the skin on the foams so produced is very thin and is, in fact, of the same order of thickness as that inherently produced on any flexible foam. The foams produced in accordance with these references are characterized by a layer of high density foam immediately beneath the outer skin and a progressive decrease in foam density in passing from the outer layer to the core. Such products, while possessing good resiliency properties, are unsuitable for heavy duty use in which the material is subjected to abrasive forces, indentation caused by impact with non-yielding bodies, and the like, such as are routinely encountered when the material is used for padding and like purposes in automotive and other transportation fields.

SUMMARY OF THE INVENTION

This invention makes available for the first time a resilient polyurethane foam having an integrally formed skin of a thickness and strength such that it is ideally suited for energy absorbing and the like purposes discussed and exemplified above. This invention also makes available a method for the preparation of said foam in a single step procedure.

Thus, in its broadest aspect, the present invention comprises an article of resilient polyurethane foam comprising a resilient cellular core of substantially uniform density and an integrally formed, tough, substantially continuous surface skin surrounding said core, said skin having an average thickness of at least 0.05 centimeters, the boundary between said skin and said core being characterized by an abrupt change in density. Said article can take a variety of shapes and forms, as hereinafter described, but in all such shapes the essential features set forth above are always present.

The process of the invention which gives rise to the novel self-skinned foams defined above, comprises reacting, under foam producing conditions in the absence of extraneous water and under abnormal surfactant usage conditions, (a) a polyisocyanate, (b) a polyol having an hydroxyl equivalent weight of from about 300 to about 3000 and a functionality of about 2.0 to about 4.0, and (c) a polyhalogenated aliphatic hydrocarbon blowing agent.

DETAILED DESCRIPTION OF THE INVENTION

Figure 1:
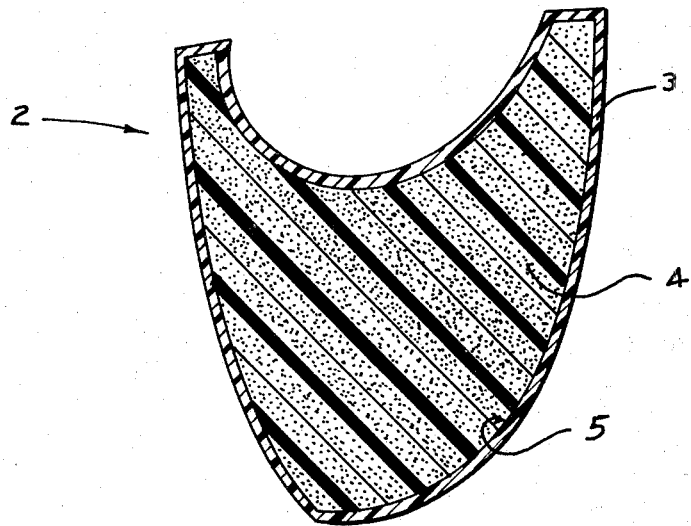
FIG. 1 is a cross-sectional view of an automobile headrest produced in accordance with the invention.

As set forth above, this invention provides for the first time a flexible polyurethane foam on the surface of which there is a tough, relatively thick, substantially continuous skin, which skin has been integrally formed i.e. has been generated in situ by the foam producing mixture. Said skin is itself flexible and exhibits high tear strength, high resistance to permanent deformation, high resistance to abrasion and high flex strength. Said skin is also relatively impervious to moisture and can readily be painted by dipping or by coating. By appropriate design of the surfaces of the mold there can be imparted permanently to the surface of the skin such markings, indentations or bas relief work as are necessary to impart a wood or leather grain or other appropriate surface appearance as may be desired.

Further, said skin is truly a skin. That is to say, said skin has a finite thickness and the point at which the inner boundary of the skin meets the cellular core is clearly apparent to the eye when a cross-sectional sample of a foam of the invention is inspected. Indeed, so clearly defined is the boundary that it is difficult to realize, from a casual glance, that the skin and foam have not been produced separately and bonded together.

The skin formed on the outer surface of the novel foams of the invention is microcellular. Said skin generally has a minimum average thickness of about 0.1 centimeters. The thickness of the skin on any given foam of the invention remains fairly uniform throughout its entirety even when said foams are molded in shapes having narrow projections such that the width of cross-section of the foam thereat approaches twice the average thickness of the skin with little core material present between the skins. By variation in the method of preparation, as discussed below, it is possible to produce skins of average thickness up to about 0.4 centimeters. The density of the skin has been found to be in fairly constant relationship to the density of the cellular core. Thus, the density of said skin is generally between 20 and 45 pounds per cubic foot.

The cellular core of the self-skinned foam of the invention is generally of substantially uniform density. As pointed out above the boundary between the skin and the core is clearly delineated and is marked by an abrupt change of density. The density and cell structure of the cellular core in that portion which abuts the skin are not substantially different from the density and cell structure, respectively, of the central portion of the core. In general, the density of said cellular core can vary from about 2 p.c.f. to about 20 p.c.f. Any required density of the core within the above limits can be achieved by adjusting the amount of blowing agent employed in the formulation, as is discussed in more detail below.

By appropriate changes in the formulation used to prepare the foams of the invention the characteristics of the cellular core can be varied so that they correspond to any of the whole group of foams which are classified broadly as flexible. The term "flexible" is used herein in the sense in which is conventionally interpreted when characterizing a particular group of polyurethane foams; see, for example, Saunders et al., Polyurethanes: Chemistry and Technology, Part II, page 117, Interscience Publishers, New York, 1964. Thus said term is used to describe a class of polyurethane foams characterized by a high ratio (i.e. greater than unity and generally from about 15:1 to 70:1) of tensile strength to compressive strength (at 25% deflection) as determined by ASTM D–1564–62T, high elongation, high rate of recovery from distortion (rebound), and high elastic limit. These characteristics distinguish a "flexible" from a "rigid" polyurethane foam, the latter being characterized by a combination of a high ratio of compressive to tensile strength, low elongation, low rate of recovery from distortion (rebound), and a low elastic limit.

Within the broad classification of flexible foams, as defined above, is a group of foams commonly referred to as "semi-flexible." Semi-flexible foams possess the distinguishing properties described above for the generic class of flexible foams and, in addition, are characterized by a high order of compressive strength (the ratio of tensile to compressive strength at 25% deflection remaining greater than unity), a density of the order of about 2.0 to about 30 lbs. per cubic foot and a low rate of rebound. The semi-flexible foams are frequently described as "energy absorbing" foams and find their chief use in packaging, protective padding formulation, and the like, wherein the foam is employed to cushion the effect of the impact between solid bodies in different states of motion.

A further group of foams which are commonly regarded as falling within the general classification of flexible foams but which approach the border line between flexible and rigid are those termed "semi-rigid." These still possess a ratio of tensile to compressive strength (at 25% deflection) which is greater than unity but the absolute values of tensile and compressive strength are low. In addition, the semi-rigid foams possess a low rate of recovery from distortion and low elastic limit. The amount of cross-linking in a semi-rigid foam is markedly greater than that in the average flexible foam.

It is to be understood that the term "flexible foam" as used throughout the specification and claims, unless otherwise stated, has the meaning set forth above and is inclusive of semi-flexible (energy-absorbing) and semi-rigid foams.

In FIG. 1 there is shown, in cross-sectional view, a specific embodiment of the invention. FIG. 1 shows a cross-section of a headrest (2) prepared in accordance with the invention. The headrest (2) has an inner flexible cellular core (4) which is completely surrounded by a tough, flexible microcellular skin (3). The boundary (5) between the core (4) and the skin (3) is clearly visible to the naked eye and is marked by an abrupt change in density between the core (4) and the skin (3). The boundary layer of core (4) is marked by an open cell network whereas the boundary layer of the skin (3) is microcellular.

Figure 2:
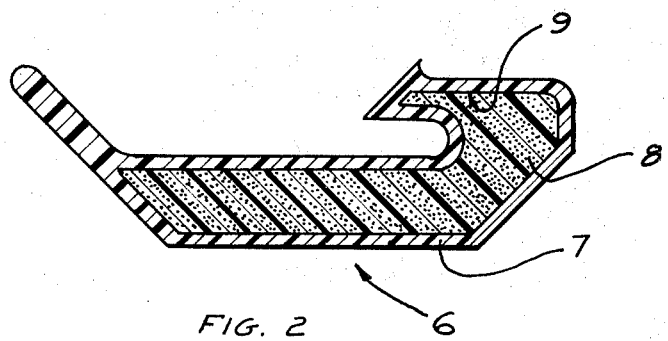
FIG. 2 is a cross-sectional view of an automobile windshield A-frame pad produced in accordance with the invention.

In FIG. 2 there is shown, in cross-sectional view, a second specific embodiment of the invention. FIG. 2 shows a cross-section of a windshield A-post pad (6) prepared in accordance with the invention. The A-post pad (6) has an inner flexible cellular core (8) which is completely surrounded by a tough, flexible microcellular skin (7). The boundary (9) between the core (8) and the skin (7) is clearly visible to the naked eye and is marked by an abrupt change in density between the core (8) and the skin (7). The boundary layer of core (8) is marked by an open cell network whereas the boundary layer of the skin (7) is microcellular.

The properties of the self-skinned flexible foams of the invention, coupled with the ease of preparation thereof in a one-shot operation, make them useful for a wide variety of applications. In particular, the novel self-skinned foams of the invention are especially useful as safety padding in the transportation industry (aircraft, automotive, truck etc.) such padding being inclusive of instrument panel pads, sun visors, windshield A-frame padding, door pads, arm rests, floor mats or carpeting underlay, seat topper pads, headrests, and the like. The novel foams of the invention can also be used as protective padding in athletic equipment, in the packaging of delicate instruments or fragile articles, toys, lawn or outdoor furniture, cushions, artificial limbs, and the like. Other uses of the novel self-skinned foams of the invention will be apparent to one skilled in the art.

The novel self-skinned foams of the invention are prepared by modifying the foam mix formulations generally employed in the art of making flexible polyurethane foams in such a manner that the cells proximating the surface of the advancing foam are in an unstable state and collapse on contact with alien surfaces such as the walls of a mold. Further, this modification of the prior art formulations is carried out in such a manner that the bulk of the foam mix shows no tendency to collapse and is still capable of yielding a good flexible foam of satisfactory structural strength. That such a result could be achieved in unexpected, the more so because it was found necessary to flout previously held concepts of the most appropriate method of making flexible foams in order to attain the desired end.

The process finally found by us to produce the novel self-skinned flexible foams of the invention differs from conventional methods for preparing flexible polyurethane foams in at least three significant ways. Firstly, it was found necessary to avoid the use of water as the blowing agent. Flexible foams are conventionally prepared using water alone or a mixture of water and a volatile hydrocarbon, preferably a volatile polyhalogenated hydrocarbon as hereinafter defined, as the blowing agent. In such systems the water reacts with a portion of the polyisocyanate component to produce carbon dioxide which acts as the blowing agent. The volatile hydrocarbon blowing agent is merely volatilized by the heat of reaction generated in the foam mix.

However, in preparing foams in accordance with the present invention, it has been found essential to avoid adding extraneous water to the foam reaction mixtures. The small amounts of water (of the order of 0.1 percent by weight of polyol) which are present in the polyol component of the foam mix and which are thereby carried into the reaction mixture can be tolerated but the addition of any further quantities of water, in excess of the amounts intrinsically incorporated with the polyol, is fatal to success. This requirement is expressed throughout the specification and claims as "the absence of extraneous water" in the foam reaction mixture.

The second way in which the process of the invention differs from the prior art procedures follows naturally from the first requirement. Thus, in the absence of extraneous water the blowing agent employed in accordance with the invention is a polyhalogenated aliphatic hydrocarbon such as those conventionally employed in the preparation of rigid polyurethane foams. By "polyhalogenated" is meant that at least two (2) different halogen atoms are present in the molecule. Said polyhalogenated aliphatic hydrocarbons generally have boiling points ranging from about −40° C. to about 110° C. depending upon the particular type of foam to be produced. Those having a boiling point in the lower end of the above-stated range are employed in the preparation of froth foams whereas those in the higher boiling range are employed in conventional (as opposed to froth) systems. Examples of polyhalogenated aliphatic hydrocarbons are trichloromonofluoromethane, dichlorodifluoromethane, chlorotrifluoromethane, 1,1-dichloro-1-fluoroethane, 1,1-difluoro-1,2,2-trichloroethane, 1,1,1-tribromo-2-chloro-2-fluorobutane, and the like. Mixtures of one or more such blowing agents can be used, if desired. The amount of polyhalogenated aliphatic hydrocarbon employed in preparing the self-skinned foams of the invention is within the range of about 10.4% to about 15.4% by weight based on total foam reactants.

The third way in which the process of the invention differs from the prior art procedures lies in the use of "abnormal surfactant usage conditions." By the latter term is meant employing concentrations and/or types of surfactants in a manner contrary to that which is regarded as necessary in order to produce satisfactory flexible foams. The above term embraces (a) the use of an agent which we have designated a "peripheral foam destabilizer," as defined hereinafter, and (b) conditions in which no surfactant of any kind is employed in the system. These two types of "abnormal surfactant usage conditions" will be discussed in turn.

The term "peripheral foam destabilizer" is used herein to designate each of two types of material. Both types of material are surface-active agents which have previously been employed as foam ingredients but under entirely different circumstances and at significantly different concentrations than are used in accordance with the present invention. The first of said two types of material which can be used as peripheral foam destabilizers is that group of surfactants which possess antifoam properties and which have hitherto been used as cell stabilizers in preparing flexible polyurethane foams by the prepolymer route only. Said antifoam agents have been employed for the latter purpose in amounts of a maximum of about 0.02% by weight based on the total weight of the foam reaction mixture. Their use in one-shot flexible foam systems has been said to give rise to splits and foam collapse and accordingly they have not been used for such systems. We have now found, surprisingly and unexpectedly, that said agents can be used in one-shot foam systems prepared in accordance with the invention. Even more surprisingly, we have found that, in order to achieve said effect, these agents must be used in concentrations markedly higher than those which the art teaches would cause foam collapse in one-shot foam systems. Thus the antifoam agents, when employed in the foam reaction mixtures used in accordance with this invention, must be present in the foam reaction mixture in amounts corresponding to about 0.01% to about 7% by weight of the latter. The preferred proportions are 0.1% to 2% by weight based on the weight of the foam reaction mixture.

Illustrative of said antifoam agents are the so-called "silicone fluids," capryl alcohol, 2,6-dimethyl-4-heptanol, sulfonated natural oils, the higher fatty acid amides such as N,N'-distearoylethylenediamide, the polymerized polyalkylene glycols marketed under the trade name of Ucon fluids, alkyl lactates, higher esters such as 2-(di-tert-amylphenoxy)-ethanol and the like, see, for example, Encyclopedia of Chemical Technology, edited by Kirk-Othmer, Interscience, New York, Volume 6, 1954, pages 776–777.

The silicone fluids are the preferred class of antifoam agents. These fluids are a well-recognized class of compounds; see, for example, Encyclopedia of Chemical Technology, edited by Kirk-Othmer, Interscience, New York, Volume 12, 1954, pages 396–403. The most commonly available of these fluids are the dimethyl silicone fluids which have the generic structure

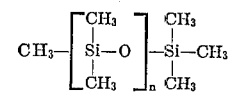

and which are available in a wide range of viscosities, the viscosity being a function of the value of $n$ in the above formula. The silicone fluids are so inclusive of the methyl phenyl silicone fluids in which some of the methyl groups in the compounds of the above formula are replaced by phenyl. The most preferred silicone fluids for use in accordance with the invention are the dimethyl silicone fluids having viscosities within the range of about 0.5 centistokes to above 20 centistokes.

The second of said two types of material which can be used as peripheral foam destabilizers is that group of surfactants which have hitherto been used to promote uniform fine cell structure in flexible polyurethane foams at concentration levels of the order of about 0.6% to about 1% by weight based on the total weight of the foam mixture. It has been found surprisingly that when these surfactants are used in concentrations markedly less than the above, namely in amounts ranging from about 0.01% to about 0.3% by weight based on weight of total foam reaction mixture, they act as peripheral foam destabilizers.

Illustrative of said surfactants, which can be employed in the above concentration levels as peripheral foam destabilizers, are sulfonated castor oils, amine esters of fatty acids, sulfated fatty acid esters, sulfated fatty acid amides, polyoxypropylene polyoxyethylene copolymers, alkylsilicone polyoxyalkylene block copolymers wherein the polyalkylene is polypropylene or polyethylene or a combination of both (see, for example, Boudreau, Modern Plastics, 44, January 1967, page 133 et seq.), poly(dialkylsiloxanes), polyoxyalkylene ethers of alkylphenols, polysilylphosphonates, dialkyl sulfosuccinates (employed in the foam of their sodium salts) such as sodium dioctylsulfosuccinate, and the like.

The second type of "abnormal surfactant usage conditions" employed in the process of the invention are those conditions in which no surfactant watsoever is employed in the foam reaction mix. Hitherto it has been regarded as essential to use a surface active agent in the preparation of one-shot flexible polyurethane foams to promote uniform cell formation, cell growth and cell stability. The absence of such surface active agents has hitherto been considered to lead to the coalescence of the cellular network yielding coarse, large-celled foams having inferior mechanical properties which are not commercially useful; see, for example, Saunders et al., ibid., Part II, pages 44, 50, and 67. We have found, quite surprisingly and unexpectedly that the novel self-skinned polyurethane foams of the invention which have uniform and desirable cell structure, can be made in the absence of any surface active agent provided that all the other critical requirements of the foam mixture, as discussed above, are present.

Subject always to the essential changes discussed above, the procedures and components employed in making the novel foams of the invention are those conventionally employed in the art of preparing flexible polyurethane foams.

Thus, any of the polyisocyanates commonly employed in making flexible foams can be employed as the isocyanate components. Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate, 1,5-naphthalene diisocyanate, 1,4-diethylbenzene-$\beta,\beta'$-diisocyanate and other di- and higher polyisocyanates such as those listed in the tables of Siefken, Ann., 562, 122–135 (1949). Mixtures of two or more of the above isocyanates can be used, such as mixtures of the 2,4- and 2,6-isomers of tolylene diisocyanate, mixtures of the 2,4'- and 4,4'-isomer of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15% by weight of the starting material, to an artefact of said starting material. For example, the polyisocyanate component can be methylenebis(phenyl isocyanate) which has been converted to a stable liquid at temperatures of about 15° C. and higher using, for example, the processes described in Belgian Pat. 678,773.

Illustrative of another modified form of 4,4'-methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide in accordance, for example, with the procedure described in British Pat. 918,454. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component a mixture of methylenebis(phenyl isocyanate) with polymethylene polyphenyl isocyanates of higher functionality. Such mixtures are generally those obtained by phosgenation of corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art, see, for example, U.S. 2,683,730, 2,950,263, 3,012,008, and 3,097,191; Canadian Pat. 665,495; and German Pat. 1,131,877. The preferred polyisocyanates are methylenebis(phenyl isocyanates) and the modified forms thereof including mixtures of polymethylene polyphenyl isocyanates containing from about 35% by weight to about 85% by weight of methylenebis(phenyl isocyanate). The polymethylene polyphenyl isocyanate available commercially under the trademark PAPI® is typical of this type of polyisocyanate.

Similarly the polyol component employed in the preparation of the novel foams of the invention can be any of the polyols conventionally employed in the preparation of flexible polyurethane foams. Said polyols include polyesters and polyethers having hydroxyl equivalent weights within the range of from about 300 to about 3,000 and an average functionality of from about two to about four.

Examples of polyester polyols which can be employed as the polyol component in the process of the invention are those having hydroxyl numbers within the above indicated ranges prepared from dibasic carboxylic acids and polyhydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids can be used also. The polyol component or components of the polyester are preferably trihydric alcohols. Examples of suitable such polyols include trimethylolethane, trimethylolpropane, mannitol, hexanetriol, glycerol, and pentaerythritol. Mixtures of two or more such polyols can be used. In addition a mixture of one or more of said trihydric polyols with a minor amount of a dihydric alcohol such as ethylene glycol, diethylene glycol, 1,2-propylene glycol, 1,4-butanediol, cyclohexanediol, and the like, can also be used in esterification of the dibasic carboxylic acid.

The polyether polyols employed in the preparation of the compositions of the invention can be any of those having hydroxyl equivalent weights and functionalities within the above stated ranges. Illustrative of such polyether polyols are the adducts of alkylene oxides such as ethylene oxide, propylene oxide, 1,2-butylene oxide and the like, or mixtures of two or more such oxides, and polyhydric alcohols containing from 2 to 4 hydroxyl groups such as propylene glycol, ethylene glycol, dipropylene glycol, glycerol, trimethylolpropane, trimethylolethane, pentaerythritol, 1,2,6-hexanetriol and the like. Such polyether polyols and methods for their preparation are well known in the art. If desired, a combination of two or more such polyether polyols can be employed as the polyether polyol component of the compositions of the invention.

The polyether polyols which can be employed in the process of the invention are also inclusive of polymeric vinyl polyether polyols having average functionalities and hydroxyl equivalent weights within the above stated limits. Illustrative of such polymeric vinyl polyethers are the addition reaction products of vinyl monomers and a polyether polyol. Examples of suitable vinyl monomers are: styrene, isoprene, vinyl chloride, vinylidene chloride, vinyl 2-ethylhexoate, vinyl butyrate, vinyl propionate, vinyl acetate, acrylonitrile, methyl methacrylate, acrolein, methyl vinyl ketone, N-vinyl-pyrrolidone, 4-vinyl-pyridine, and the like. Examples of the polyether based polyols employed as starting materials in making the polymeric vinyl polyethers are the adducts of (a) alkylene oxides such as ethylene oxide, propylene oxide, 1,2-butylene oxide and the like, or mixtures of two or more such oxides, and (b) polyhydric alcohols containing from 2 to 4 hydroxyl groups such as propylene glycol, ethylene glycol, dipropylene glycol, diethylene glycol, glycerol, trimethylolpropane, trimethylolethane, 1,2,6-hexanetriol, pentaerythritol, methyl glucoside and the like.

Such polymeric vinyl polyether polyols and methods for their preparation are well known in the art, see, for example, Kuryla et al., J. Cellular Plastics, Volume 2, No. 2, page 36, March 1966. The polymeric vinyl polyethers are preferred for use as polyols in the process of the invention because they enhance the resistance to burning conferred on the resulting novel foams of the invention. For example, the time for which the surface of a foam of the invention prepared from a polymeric vinyl polyether can be exposed to an open flame before it will ignite is approximately nine times as long as that for which a resilient polyurethane foam made in accordance with conventional procedures will resist ignition under the same conditions. Removal of the peripheral microcellular surface of the said novel foam of the invention and exposure of the inner core decreases the ignition time by a factor of about 3 but this time is still markedly superior to that of a conventional foam.

In order to produce those flexible foams of the invention which are classified as semi-flexible and semi-rigid as discussed hereinbefore it is necessary to include in the polyol component a low molecular weight polyol having a functionality of 3 or higher preferably from 3 to 6 and an hydroxyl equivalent weight from about 30 to about 200 in order to increase the degree of crosslinking and thereby, in part, increase the load bearing capacity and lower the elongation of the resulting foam. The proportion of crosslinking agent introduced into the polyol component for this purpose varies according to the properties desired in the resulting foam. Generally speaking the amount of crosslinking agent employed can vary from about 2% to about 20% by weight of the total polyol employed. Examples of crosslinking polyols having a functionality of 3 to 6 and an hydroxyl equivalent weight within the above stated range are sorbitol, pentaerythritol, methyl glucoside, trimethylolpropane, trimethylolethane, glycerol, 1,2,6-hexanetriol, and the alkylene oxide adducts thereof, hydroxyalkylated aliphatic diamines such as N,N,N',N' - tetrakis(2 - hydroxypropyl)ethylene diamine, and the like, hydroxyalkylated isocyanuric acid such as tris-(2-hydroxyethyl) isocyanurate and the like.

Said crosslinking polyols can be admixed with other polyols or mixture of polyols prior to formation of the polyurethane or can be fed into the foam mix as a separate stream during the mixing stage of a one-shot procedure.

The proportion of polyisocyanate to total polyol employed in the preparation of the flexible foams in accordance with the invention is within the normal limits employed in the production of flexible polyurethane foams. Advantageously the overall ratio of isocyanate groups to active hydrogen groups in the polyol is within the range of from 1.80:1.0 to 0.90:1.0 and is preferably within the range of 1.25:1 to 1:1 whether the isocyanate and polyol are employed separately in the one-shot process or whether the two components have been pre-reacted to form a quasi-prepolymer.

Any of the catalysts conventionally employed in the art to catalyze the reaction of a polyol and an isocyanate can be employed as catalysts in the preparation of the flexible foams of this invention. Such catalysts are described, for example, by Saunders et al., ibid., Part I, pages 228–232, and by Britain et al., J. Applied Polymer Science, 4, 207–211, 1960. Such catalysts include organic and inorganic salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Representative organotin catalysts are stannous octoate, stannous oleate, dibutyltin dioctoate, dibutyltin dilaurate and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N' - tetramethyl - 1,3 - butanediamine, N,N-dimethylethanolamine, N,N-diethylethanolamine, and the like. The preferred catalysts for use in the process of the invention are a combination of dibutyltin dilaurate and a tertiary amine selected from N,N,N',N'-tetramethyl-1,3-butane diamine and triethylenediamine. The amount of catalyst employed is generally within the range of about 0.1 to about 2 percent by weight based on the total weight of reactants.

In preparing the novel compositions of the invention the reaction of the polyisocyanate, the polyol, the blowing agent, the catalyst, and the peripheral foam destabilizer is carried out in the absence of extraneous water and in accordance with procedures well known in the polyurethane art using either the "one-shot" method or the "quasi-prepolymer" method. In the "quasi-prepolymer" method, the polyisocyanate is reacted with a portion of the polyol component. The quasi-prepolymer so obtained is subsequently reacted with the polyol component in the presence of the blowing agent, catalyst, and other adjuvants. Preferably, the polyurethane foams of the invention are prepared by the "one-shot" procedure in which each of the foam formulation constituents are brought together simultaneously either in separate streams or after preblending one or more of the polyols and like components.

Mixing of the various reaction components can be carried out by hand when operating on a small scale but is advantageously carried out using the various mixing and dispensing machines conventionally employed in the manufacture of polyurethane foams see, for example, Ferrigno, Rigid Plastic Foams, Reinhold Publishing Corporation, New York (1963), pages 51–61 and transferred to the appropriate mold or cavity to be filled.

If desired, additives such as dyes, pigments, soaps and metallic powders and other inert fillers can be added to the foam mixture to obtain special foam properties in accordance with practices well known in the art.

The core density of the self-skinned foams of the invention can be controlled where relatively low densities are required, in any desired manner, by adjusting the amount of blowing agent employed. Where higher density foams, i.e. of the order of 20 p.c.f. core density or higher, are concerned the desired density of the novel finished products of the invention may be achieved by the technique known as packing the molds, that is by using an excess of material required to fill a given cavity. Using this latter method the mold is generally closed by means of a plate, cover, or baffle which is vented to allow gases to escape from the mold but which prevents seepage of foam mix from the mold. Employing the technique of packing in the preparation of the novel products of the invention tends to increase the overall density of the finished producut with little or no effect on the thickness of the microcellular surface.

It is well known in the polyurethane foam art that preheating of molds normally reduces the thickness of the foam skin, see, for example, Handbook of Foamed Plastics, edited by R. J. Bender, Lake Publishing Corporation, Libertyville, Ill., page 238, 1965. In contrast, we have found that the novel articles of the invention are advantageously formed in molds preheated to 90° to about 120° F. Molds fabricated from a variety of materials, i.e. wood, glass, steel iron, reinforced plastics, metal filled thermoset plastics, etc. can be employed. However, molds constructed of heat conductive materials such as metal and metal filled plastics are preferred.

The following examples describe the manner and process of making and using the invention and set forth the best mode contemplated by the inventors of carrying out the invention but are not to be construed as limiting. All parts are given by weight except where otherwise indicated.

EXAMPLE 1

A resilient polyurethane foam having a cellular core and an integrally formed microcellular surface skin was prepared according to the invention as follows:

A mixture of 85 parts of a vinyl-resin reinforced polyether polyol having an hydroxyl equivalent weight of 1250, fifteen parts of a polyol obtained by the condensation of three moles of ethylene oxide with one mole of trimethylolpropane and having an hydroxyl equivalent weight of 89, 1.2 parts of a dimethyl siloxane polymer surface active agent having a viscosity of five centistokes at 25° C., 0.68 part of triethylene diamine, 0.11 part of dibutyltin dilaurate, and 18 parts of modified trichlorofluoromethane was mechanically blended at about 20° to 25° C. To this mixture was added 35 parts of modified methylenebis(phenyl isocyanate) [equivalent weight 143.3; prepared by heating methylenebis(phenyl isocyanate) containing 94% 4,4'-isomer and 6% 2,4'-isomer with 3% by weight of triethylphospsate at 220° C. for 3 hours before cooling to approximately 70° C.]. Seventy-five grams of this blend of components was mechanically agitated at 1300–1400 r.p.m. for approximately 5–10 seconds using a drill press equipped with a low lift, 3-inch diameter mixing blade and poured into a preheated (100–110° F.) vented aluminum mold measuring six inches in diameter and one-inch thick. The inner surfaces of the mold had been polished to prevent adhesion of the foam to the mold surfaces. The resulting resilient polyurethane foam (A) had a skin thickness of about 0.2 centimeters and was cured, after removal from the mold, for forty-eight hours at room temperature (circa 25°–30° C.) before testing. The following mechanical properties were measured using the test procedures set forth in ASTM D–1564–59T unless otherwise indicated:

Density, p.c.f.:
    (1) Overall _____ 9.2
    (2) Core _____ 5.0
Compression load deflection (Method A), p.s.i.:
    (1) Original sample:
        At 25% deflection _____ 3.5
        At 50% deflection _____ 8.2
        At 65% deflection _____ 21.5
    (2) After aging 7 days at 158° F., 100% relative humidity:
        At 25% deflection _____ 3.5
        At 50% deflection _____ 7.5
        At 65% deflection _____ 21.1
Compression set (Method B), percent (22 hours at 158° F., 50% deflection):
    (1) Original sample _____ 7.8
    (2) Aged 7 days at 158° F., 100% relative humidity _____ 1.2
Tear strength _____p.l.i__ 2.2
Tensile strength _____p.s.i__ 38.4
Elongation _____percent__ 120.0
Open cells _____do____ 96.0
Resilience _____do____ 20.0

Employing the procedure set forth above a mock-up of a detailed mold for an automotive instrument panel was fabricated. Similarly, a mock-up of an automotive head rest and an automotive windshield A-frame pad were made. The resultant products were characterized by overall densities of approximately 7 to 14 pounds per cubic foot and by smooth microcellular skins having thicknesses of approximately 0.2 centimeters.

EXAMPLE 2

A microcellular thick skin polyurethane foam of the invention was prepared employing the process and test procedures of Example 1, using the ingredients set forth in Table I. The foam, after curing for 48 hours at room temperature, was found to have the properties shown below.

TABLE I

| | Foam B |
|---|---|
| Polyol of equivalent weight 1250 as used in Example 1 | 85 |
| Trimethylolopropane/ethylene oxide adduct (hydroxyl equivalent weight=89) | 15 |
| Water-soluble non-hydrolysable organosilicone surfactant cell-opener | 3 |
| Water-soluble non-hydrolysable organosilicone surfactant cell-opener | 3 |
| Triethylene-diamine | 0.3 |
| Dibutyltin dilaurate | 0.2 |
| Trichlorofluoromethane | 22 |
| Isocyanate of Example 1 | 41.7 |
| Physical Properties | |
| Density (of molded piece), p.c.f. | 10.4 |
| Compression load deflection (Method A), p.s.i.: | |
|   (1) Original sample: | |
|     At 25% deflection | 11.3 |
|     At 50% deflection | 12.7 |
|     At 65% deflection | 16.8 |
|   (2) After aging 7 days at 158° F., 100% relative humidity: | |
|     At 25% deflection | 9.9 |
|     At 50% deflection | 11.9 |
|     At 65% deflection | 17.7 |
| Compression set (Method B), percent (22 hours at 158° F., 50% deflection): | |
|   (1) Original sample | 9.0 |
|   (2) Aged 7 days at 158° F., 100% relative humidity | 3.0 |
| Tear strength _____p.l.i__ | 2.8 |
| Tensile strength _____p.s.i__ | 42.4 |
| Open cells _____percent__ | 98 |

EXAMPLE 3

A series of the novel polyurethane products of the invention with integrally formed microcellular skins was prepared according to the procedure set forth in Example 1, including molding, and employing the reactants specified in Table II. The physical properties of the resulting foams were determined using the test procedures set forth in Example I.

TABLE II

| | Foam C | Foam D |
|---|---|---|
| Polyol [1] | 85 | |
| Polyol [2] | | 85 |
| Polyol [3] | 15 | 15 |
| Water-insoluble non-hydrolysable organosilicone surfactant cell-opener | 1 | 1 |
| Triethylene diamine | 1 | 1 |
| Dibutyltin dilaurate | 0.3 | 0.3 |
| Stabilized trichlorofluoromethane | 18 | 18 |
| Isocyanate of Example 1 | 32.4 | 32.4 |
| Physical properties: | | |
|   Density (of molded piece), p.c.f. | 9.7 | 9.7 |
|   Compression load deflection (method A), p.s.i.: | | |
|     1. Original sample— | | |
|       At 25% deflection | 2.7 | 3.3 |
|       At 50% deflection | 4.5 | 4.7 |
|       At 65% deflection | 8.1 | 7.9 |
|     2. Aged 7 days at 158° F., 100% relative humidity— | | |
|       At 25% deflection | 2.3 | 2.2 |
|       At 50% deflection | 4.1 | 3.3 |
|       At 65% deflection | 8.2 | 5.8 |
|   Compression set (method B), percent (22 hours at 158° F., 50% deflection): | | |
|     1. Original sample | 0.8 | 1.5 |
|     2. Aged 7 days at 158° F., 100% relative humidity | 0.2 | 0.5 |
|   Tear strength, p.l.i. | 0.8 | 0.7 |
|   Tensile strength, p.s.i. | 11.0 | 8.9 |
|   Elongation, percent | 45.0 | 60.0 |
|   Open cells, percent | 98.0 | 99.0 |

[1] 3,000 M.W. polyether triol containing primary hydroxyl groups.
[2] 3,000 M.W. polyether triol containing approximately 50% primary hydroxyl groups.
[3] 590 M.W. polyether polyol, hydroxyl equivalent weight 118 functionality=5.

EXAMPLE 4

A series of novel polyurethane foams of the invention was prepared with integrally molded microcellular skins. The operating procedure, including molding, was that described in Example 1. All ingredients other than the isocyanate were preblended prior to admixture with the isocyanate. The ingredients are set forth in Table III. After removal of the foams from the mold and curing for 48 hours at approximately 25° C. various physical properties of the foams were determined and are shown in Table III below.

TABLE III

|  | Foams | | | |
|---|---|---|---|---|
|  | E | F | G | H |
| Polyol of equivalent weight 1250 as used in Example 1 | 85 | 85 | 85 | 85 |
| Polyether polyol, hydroxyl equivalent weight 118 | 15 | 15 | 15 | 15 |
| Water-insoluble nonhydrolysable organosilicone surfactant cell-opener | 1 | 1 | 1 | 1 |
| Triethylene diamine | 1 | 1 | 1 | 1 |
| Dibutyltin dilaurate | 0.3 | 0.3 | 0.3 | 0.3 |
| Stabilized trichlorofluoromethane | 18 | 18 | 18 | 18 |
| Isocyanate of Example 1 | 25.6 | 30.5 | 32.7 | 35.5 |
| Isocyanate index | 0.90 | 1.05 | 1.15 | 1.25 |
| Physical properties: |  |  |  |  |
| Density (of molded piece), p.c.f. | 10.0 | 10.5 | 10.7 | 10.0 |
| Approximate skin thickness, cm. | 0.3 | 0.3 | 0.4 | 0.5 |
| Skin appearance | Fair, uniform thickness, minor surface voids. | | Good, uniform thickness, no surface voids. | |

EXAMPLE 5

Two self-skinning resilient polyurethane foams were prepared according to the procedure of Example 1 employing the ingredients of Table IV. The resultant microcellular thick skin foams, after curing 48 hours at 25° C., were tested according to the test methods of Example 1.

TABLE IV

|  | Foams | |
|---|---|---|
|  | I | J |
| Polyol of equivalent weight 1250 as used in Example 1 | 85 | 85 |
| Polyol [1] | 15 |  |
| Polyol [2] |  | 15 |
| Water-insoluble nonhydrolysable organosilicone surfactant cell-opener | 1 | 1 |
| Triethylene diamine | 1 | 1 |
| Dibutyltin dilaurate | 0.3 | 0.3 |
| Trichlorofluoromethane | 18 | 18 |
| Isocyanate of Example 1 | 36.7 | 38.8 |
| Physical properties: |  |  |
| Density (of molded piece), p.c.f. | 10.5 | 10.0 |
| Compression load deflection (method A), p.s.i.: |  |  |
| 1. Original sample— |  |  |
| At 25% deflection | 5.8 | 13.1 |
| At 50% deflection | 8.9 | 26.5 |
| At 65% deflection | 23.9 | 69.8 |
| 2. Aged 7 days at 158° F., 100% relative humidity— |  |  |
| At 25% deflection | 5.1 | 10.8 |
| At 50% deflection | 9.2 | 22.5 |
| At 65% deflection | 24.0 | 60.0 |
| Compression set (method B), percent (22 hours at 158° F., 50% deflection): |  |  |
| 1. Original sample | 14.1 | 31.4 |
| 2. Aged 7 days at 158° F., 100% relative humidity | 2.3 | 13.0 |
| Tear strength, p.l.i. | 2.7 | 1.8 |
| Tensile strength, p.s.i. | 44 | 51 |
| Elongation, percent | 108 | 42 |
| Open cells, percent | 97 | 98 |

[1] Glycerine/propylene oxide adduct, hydroxyl equivalent weight 90.
[2] Amine based polyether polyol, hydroxyl equivalent weight 79.

EXAMPLE 6

Following the procedure of Example 1, but employing various ratios of cross linking polyol to high molecular weight polyol, there are obtained microcellular self-skinning resilient foams of the following composition and physical properties using the test procedures of Example 1.

TABLE V

|  | Foams | |
|---|---|---|
|  | K | L |
| Polyol of equivalent weight 1250 as used in Example 1 | 90 | 85 |
| Trimethylolpropane/ethylene oxide adduct (hydroxyl equivalent weight=89) | 10 | 15 |
| Water-insoluble nonhydrolysable organosilicone surfactant cell-opener | 1.0 | 1.0 |
| Triethylene diamine | 1.0 | 1.0 |
| Dibutyltin dilaurate | 0.3 | 0.3 |
| Stabilized trichlorofluoromethane | 15 | 25 |
| Isocyanate of Example 1 | 27.4 | 35.0 |
| Physical properties: |  |  |
| Density (of molded piece), p.c.f. | 9.4 | 10.0 |
| Compression load deflection (method A), p.s.i.: |  |  |
| 1. Original sample— |  |  |
| At 25% deflection | 2.5 | 4.7 |
| At 50% deflection | 5.4 | 8.2 |
| At 65% deflection | 14.3 | 18.4 |
| 2. After aging 7 days at 158° F., 100% relative humidity— |  |  |
| At 25% deflection | 2.9 | 4.7 |
| At 50% deflection | 4.8 | 8.0 |
| At 65% deflection | 11.6 | 19.3 |
| Compression set (method B), percent (22 hours at 158° F., 50% deflection): |  |  |
| 1. Original sample | 42 | 47 |
| 2. After aging 7 days at 158° F., 100% relative humidity | 26 | 26 |
| Tear strength, p.l.i. | 1.5 | 2.8 |
| Tensile strength, p.s.i. | 29.9 | 32.8 |
| Elongation, percent | 82 | 72 |
| Open cells, percent | 99 | 99 |

EXAMPLE 7

A thick microcellular self-skinning resilient polyurethane foam was prepared in accordance with the invention employing a foam metering and dispensing modulating unit having a diamond cross-cut impeller rotating at 2,000 r.p.m. using the following ingredients and proportions:

Thirty-five parts of the modified methylenebis(phenyl isocyanate) of Example 1 (Component A), 103.6 parts of a preformed mixture of 85 parts of polyol of equivalent weight 1250 as used in Example 1, 18 parts of stabilized trichlorofluoromethane, 0.025 parts of dibutyltin dilaurate, and 0.6 parts of triethylenediamine (Component B), and 15 parts of a preblended mixture of 15 parts of trimethylolpropane/ethylene oxide adduct having an equivalent weight of 89 and 0.075 parts of organosilicone copolymer surfactant were brought together as three separate streams into the mixing chamber and dispensed at approximately 4.5 pounds per minute into the mold of Example 1 preheated to 100°–110° F.

The resultant thick skin foam "M" had an overall density of approximately ten pounds per cubic foot and a skin thickness of approximately 0.3 centimeters.

EXAMPLE 8

A thick microcellular self-skinning polyurethane foam of the invention was prepared using the procedure set forth in Example 1 and employing the reactants set forth in Table VI. Physical properties of the resultant foam "N" were determined using the test procedures set forth in Example 1.

TABLE VI

|  | Foam N |
|---|---|
| Polyol of equivalent weight 1250 as used in Example 1 | 85 |
| Polyether polyol, hydroxyl equivalent weight 118 | 15 |
| Water-insoluble non-hydrolysable organosilicone surfactant cell-opener | 1 |
| Triethylenediamine | 1 |
| Dibutyltin dilaurate | 0.3 |
| Stabilized trichlorofluoromethane | 15 |
| Polymethylene polyphenyl isocyanate of I.E.=130 | 27.2 |
| Physical Properties | |
| Density of molded piece, p.c.f. | 10.7 |
| Compression load deflection (Method A), p.s.i.: | |
| (1) Original sample: | |
| At 25% deflection | 14.6 |
| At 50% deflection | 26.0 |
| At 65% deflection | 46.9 |

TABLE VI—Continued (2) After aging 7 days at 158° F., 100% relative humidity:
- At 25% deflection — 16.5
- At 50% deflection — 26.5
- At 65% deflection — 110.3

Compression set (Method B), percent (22 hours at 158° F., 50% deflection):
- (1) Original sample — 3.3
- (2) After aging 7 days at 158° F., 100% relative humidity — 4.4

Tear strength — p.l.i. — 1.5
Tensile strength — p.s.i. — 52.0
Elongation — percent — 40.0
Open cells — do — 98.0

EXAMPLE 9

A resilient polyurethane foam having a unitary cellular core and an integrally formed microcellular surface skin was prepared using the procedure of Example 1 and employing the reactants set forth in Table VII. Physical properties of the resultant foam "O" were determined using the test procedures set forth in Example 1.

TABLE VII

|  | Foam O |
|---|---|
| Polyol of equivalent weight 1250 as used in Example 1 | 85 |
| Trimethylolpropane/ethylene oxide adduct (hydroxyl equivalent weight=89) | 15 |
| Organosilicone copolymer surfactant | 0.075 |
| Triethylene diamine | 0.6 |
| Dibutyltin dilaurate | 0.08 |
| Stabilized trichlorofluoromethane | 18 |
| PAPI® | 33 |

Physical Properties

Density (of molded piece), p.c.f. — 6.95

Compression load deflection (Method A), p.s.i.:
- At 25% deflection — 4.6
- At 50% deflection — 12.9
- At 65% deflection — 35.0

Compression set (Method B), percent (22 hours at 158° F., 50% deflection):
- (1) Original sample — 1.18
- (2) After aging 7 days at 158° F., 100% relative humidity — 7.06

Tensile strength — p.s.i. — 19.9
Elongation — percent — 35
Open cells — do — 88

EXAMPLE 10

A resilient polyurethane foam having a thick integrally formed microcellular peripheral surface was prepared in accordance with the invention employing the reactants set forth in Table VIII and the procedures of Example 1. The resultant foam "P" had a density of approximately eight pounds per cubic foot and a skin thickness of about 0.2 to 0.3 centimeters.

TABLE VIII

|  | Foam P |
|---|---|
| Polyol of equivalent weight 1250 as used in Example 1 | 85 |
| Trimethylolpropane/ethylene oxide adduct (hydroxyl equivalent weight=89) | 15 |
| Organosilicone copolymer surfactant | 0.075 |
| Triethylene diamine | 0.85 |
| Dibutyltin dilaurate | 0.2 |
| Stabilized trichlorofluoromethane | 18 |
| Tolylene diisocyanate (80% 2,4-isomer, 20% 2,6-isomer) | 21 |

EXAMPLE 11

Employing the process and test procedures of Example 1 and using the ingredients set forth in Table IX a microcellular thick skin foam of the invention was prepared. The resultant foam "Q," after curing 48 hours at room temperature, was found to have the physical properties shown below.

TABLE IX

|  | Foam Q |
|---|---|
| Polyol of equivalent weight 1250 as used in Example 1 | 85 |
| Trimethylolpropane/ethyline oxide adduct | 15 |
| Organosilicone copolymer surfactant (50 centistokes) | 1 |
| Triethylene diamine | 1 |
| Dibutyltin dilaurate | 0.3 |
| Stabilized trichlorofluoromethane | 18 |
| Isocyanate of Example 1 | 35 |

Physical Properties

Density (of molded piece), p.c.f. — 9.9

Compression load deflection (Method A), p.s.i.:

(1) Original sample:
- At 25% deflection — 5.7
- At 50% deflection — 9.4
- At 65% deflection — 21.1

(2) After aging 7 days at 158° F., 100% relative humidity, p.s.i.:
- At 25% deflection — 6.0
- At 50% deflection — 8.9
- At 65% deflection — 20.0

Compression set (Method B), percent, (22 hours at 158° F., 50% deflection):
- (1) Original sample — 19.6
- (2) Aged 7 days at 158° F., 100% relative humity — 10.7

Tear strength — p.l.i. — 2.4
Tensile strength — p.s.i. — 34.8
Elongation — percent — 63
Open cells — do — 98

EXAMPLE 12

Employing the procedure, including molding, of Example 1, but replacing the "peripheral foam destabilizer" there used with the destabilizers listed below at the indicated amounts there are obtained corresponding microcellular thick skin polyurethane foams of the invention having average skin thicknesses of about 0.1 centimeters.

TABLE X

|  | Foams | | |
|---|---|---|---|
|  | R | S | T |
| Polyol of equivalent weight 1250 as used in Example 1 | 85 | 85 | 85 |
| Trimethylolpropane/ethylene oxide adduct (hydroxyl equivalent weight=90) | 15 | 15 | 15 |
| Surfactant [1] | 0.02 |  |  |
| Organosilicone copolymer surfactant |  | 5 |  |
| Nonionic emulsifier |  |  | 2 |
| DABCO 33LV | 1 | 1 | 1 |
| Dibutyltin dilurate | 0.3 | 0.3 | 0.3 |
| Stabilized trichlorofluoromethane | 18 | 18 | 18 |
| Isocyanate of Example 1 | 35 | 35 | 35 |

[1] A block copolymer of dimethyl polysiloxane and polyethylene oxide.

EXAMPLE 13

A resilient polyurethane foam of the invention having a thick microcellular peripheral surface skin was prepared employing no surface active agent and the reactants set forth in Table XI and the procedures of Example 1. The resultant foam "U" had a density of approximately 9.5 pounds per cubic foot and a skin thickness of about 0.2 centimeters.

TABLE XI

| | Foam U |
|---|---|
| Polyol of equivalent weight 1250 as used in Example 1 | 85 |
| Trimethylolpropane/ethylene oxide adduct (hydroxyl equivalent weight=89) | 15 |
| Triethylene diamine | 0.6 |
| Dibutyltin dilaurate | 0.05 |
| Stabilized trichlorofluoromethane | 18 |
| Isocyanate of Example 1 | 35 |

EXAMPLE 14

A flexible polyurethane foam having a thick integrally formed microcellular surface skin was prepared in accordance with the invention employing no surface active agent and the ingredients set forth in Table XII. The procedures of Example 1, including molding, were followed and the resultant foam "V" had an overall density of approximately 7.5 pounds per cubic foot and a skin thickness of 0.2 centimeters.

TABLE XII

| | Foam V |
|---|---|
| Polyether trial, 50% primary hydroxyl groups, equivalent weight 1000 | 85 |
| Trimethylolpropane/ethylene oxide adduct (hydroxyl equivalent weight=89) | 15 |
| Triethylene diamine | 0.6 |
| Dibutyltin dilaurate | 0.05 |
| Stabilized trichlorofluoromethane | 18 |
| Isocyanate of Example 1 | 35 |

What is claimed is:

1. A one-shot process for making a resilient polyurethane foam substantially free from urea linkage comprising a resilient cellular core of substantially uniform density within the range of about 2 p.c.f. to about 20 p.c.f. and an integrally formed, tough, substantially continuous, resilient skin of substantially uniform density surrounding said core, said skin having an average thickness of at least 0.05 centimeters, the boundary between said skin and said core being clearly delineated and being characterized by a single abrupt change of density, said process comprising reacting, under foam producing conditions in the absence of extraneous wtaer and in a closed mold:
   (a) a polyisocyanate,
   (b) a polyol having a hydroxyl equivalent weight of from about 300 to about 3000 and a functionality of about 2.0 to about 4.0,
   (c) a catalyst, and
   (d) a polyhalogenated aliphatic hydrocarbon blowing agent,
said polyhalogenated aliphatic hydrocarbon blowing agent being present in an amount within the range of about 10.4% to about 15.4% by weight of the total foam reactants, said closed mold having been preheated to a temperature within the range of about 90° F. to about 120° F.

2. The process of Claim 1 wherein the polyisocyanate is a methylenebis(phenyl isocyanate).

3. The process of Claim 1 wherein the polyol comprises an addition reaction product of a vinyl monomer and a polyether polyol and has an hydroxyl equivalent of about 500 to about 2,000 and a functionality of about 2.0 to about 4.0.

4. The process of Claim 1 wherein the catalyst is a mixture of an organo tin compound and a tertiary amine.

5. The process of Claim 1 wherein the foam reaction mixture is placed in a mold previously preheated to a temperature within the range of about 100° to about 120° F.

References Cited

UNITED STATES PATENTS 3,099,516  7/1963  Henrickson.

OTHER REFERENCES

Bianca et al.: "New Method for Producing Microcellular Polyether Urethane Rubber," Div. of Rubber Chemistry, American Chemical Society, Miami Beach, May 1965.

HERBERT S. COCKERAM, Primary Examiner

U.S. Cl. X.R.

260—2.5 AP, 2.5 BE; 264—Dig. 14